United States Patent [19]

Doi et al.

[11] 4,162,998

[45] Jul. 31, 1979

[54] PROCESS FOR PREPARATION OF ASPHALT-EPOXY RESIN COMPOSITION

[75] Inventors: Tadashi Doi, Osaka; Harumi Takahashi, Wakayama, both of Japan

[73] Assignee: Kao Soap Co., Ltd., Tokyo, Japan

[21] Appl. No.: 896,692

[22] Filed: Apr. 13, 1978

[30] Foreign Application Priority Data

Apr. 22, 1977 [JP] Japan .................................. 52-47107

[51] Int. Cl.² .............................................. C08L 91/00
[52] U.S. Cl. .................................. 260/28 R; 260/28 P; 404/72; 404/79; 427/388 R; 428/418; 428/457
[58] Field of Search .............. 428/468; 260/28 R, 28 P

[56] References Cited

U.S. PATENT DOCUMENTS

| | | | |
|---|---|---|---|
| 3,006,877 | 10/1961 | Herzberg | 260/28 R |
| 3,012,487 | 12/1961 | Mika | 260/28 R |
| 3,015,635 | 1/1962 | Bradley et al. | 260/28 R |
| 3,105,771 | 10/1963 | Simpson et al. | 260/28 R |
| 3,238,165 | 3/1966 | Simpson et al. | 260/28 R |
| 3,277,052 | 10/1966 | Thompson et al. | 260/28 R |
| 3,842,024 | 10/1974 | Decines et al. | 260/28 R |
| 3,997,461 | 12/1976 | Davie | 260/28 R |

*Primary Examiner*—Melvyn I. Marquis
*Attorney, Agent, or Firm*—Blanchard, Flynn, Thiel, Boutell & Tanis

[57] ABSTRACT

A paving composition is prepared by mixing heated asphalt with a composition comprising an epoxy resin and an amine having 2 active hydrogens and either an aliphatic hydrocarbon group having 8 to 22 carbon atoms or an alkylphenyl group in which the alkyl has 8 to 22 carbon atoms.

14 Claims, No Drawings

PROCESS FOR PREPARATION OF ASPHALT-EPOXY RESIN COMPOSITION

BACKGROUND OF THE INVENTION

Field of the Invention

The present invention relates to a process for the preparation of asphalt-epoxy resin compositions which comprises mixing (a) a heated asphalt, with a composition comprising (b) an epoxy resin and (c) an amine having two active hydrogen atoms and either an aliphatic hydrocarbon group having 8 to 22 carbon atoms or an alkyl phenol group in which the alkyl group has 8 to 22 carbon atoms.

Ruts or waviness occur or other unwanted flows occur on the surfaces of asphalt pavements at points near intersections, on slopes, at sharp curves or on bridges constructed by using steel floor plates owing to the loads of automobiles and shear stresses caused by braking operations. Further, in snowy and cold areas, asphalt pavements are peeled off and worn away vigorously by snow tires or tire chains. These undesirable phenomena are due to the inherent property of asphalt, namely, a high temperature sensitivity, which means that its physical properties are easily changed depending on the temperature changes. For example, the temperature of the road surface can be as high as 60° C. in summer, even though the softening point of asphalt is about 43° C. Accordingly, in summer, loads of automobiles, especially static loads generated by stopping at points near intersections, readily cause rutting of pavements. Asphalt becomes hard as the ambient temperature becomes lower, and the Fraass breaking point of asphalt, at which asphalt is solidified like glass and is readily broken by a shock, is about $-14°$ C. In cold regions, the temperature of the road surface can be as low as about $-20°$ C. and shocks of a tire chain or the like can be imposed on the road surface. Accordingly, it is inevitable that the surfaces of pavements are readily broken and scattered by tire chains or snow tires in cold regions.

The composition of the present invention overcomes these defects of conventional road-paving asphalts. The composition of the present invention is especially effective for repairing existing roads at intersections, slopes or sharp curves at which rutting or waviness has already occurred. The reason is that the composition of the present invention satisfies an important requirement for the repair of roads, namely, that the time during which the road is blocked or closed while the repair is being done should be as short as possible. In the present invention, the amine acting as a curing agent for the epoxy resin has only two active hydrogen atoms for reacting with epoxy groups, and therefore, if a difunctional epoxy resin is used, a thermoplastic linear epoxy resin is readily formed. Accordingly, if the specific amine of the present invention and an epoxy resin are added to a heated asphalt, the reaction progresses rapidly thereby to increase the molecular weight of the epoxy resin, but since the resulting epoxy resin is thermoplastic, the heated asphalt-epoxy resin composition retains a liquid state. Therefore, an asphalt mixture including this asphalt-epoxy resin composition as a binder has a very good operational adaptability when used in the heated state, and when the temperature of the paving composition is lowered to ambient temperature, the mixture forms a pavement having a very high strength. Accordingly, when an asphalt mixture including the asphalt-epoxy resin composition prepared according to the process of the present invention is used for repairing roads, the road can be opened to traffic again after only a short time required for cooling of the repaired pavement, calculated from the completion of the paving treatment. For example, when the epoxy resin content is 40% by weight, the asphalt-epoxy resin composition according to the present invention has a softening point of 125° C., a Fraass breaking point of $-40°$ C., a tensile strength of 22 Kg/cm$^2$ and an elongation of 300%, although the values of these physical properties vary to some extent depending on the amount of the epoxy resin in the paving composition. Accordingly, it is expected that when the asphalt-epoxy resin composition according to the present invention is used for a paving operation, the resulting pavement will not become softened in summer and it will not be broken up or scattered by shocks of tire chains in winter. Moreover, the fact that the elongation is as high as 300% means that even if the substrate is an asphalt pavement or steel floor plate, the pavement made of the composition of the present invention can follow the bending or other deformation of the substrate.

In the present invention, as the amine having two active hydrogen atoms and either an aliphatic hydrocarbon group having 8 to 22 carbon atoms or an alkyl phenol group in which the alkyl group has 8 to 22 carbon atoms, there are preferably employed compounds having the following formula:

$$R-NH_2 \qquad (I)$$

wherein R stands for an alkyl group having 8 to 22 carbon atoms or an alkenyl group having 8 to 22 carbon atoms, compounds having the following formula:

$$R'-O-A_n-(CH_2)_3-NH_2 \qquad (II)$$

wherein R' stands for an alkyl group having 8 to 22 carbon atoms or an alkenyl group having 8 to 22 carbon atoms, or an alkylphenyl group in which the alkyl group has 8 to 22 carbon atoms, A stands for an oxyethylene or oxypropylene group, and n is an integer of from 0 to 20, and compounds represented by the following general formula:

$$RNH-R_1-NH-B \qquad (III)$$

wherein R stands for an alkyl group having 8 to 22 carbon atoms or an alkenyl group having 8 to 22 carbon atoms, $R_1$ stands for an alkylene group having 2 to 3 carbon atoms, and B stands for a group selected from the class consisting of hydroxyethyl, 1-hydroxy-2-methylethyl, 1-chloro-2-hydroxypropyl, cyanoethyl and propionic acid ester groups.

As specific examples of the compounds represented by the above formula (I), there can be mentioned octyl amine, lauryl amine, myristyl amine, palmityl amine, stearyl amine, oleyl amine, behenyl amine and beef tallow amine.

As specific examples of the compounds represented by the above formula (II), there can be mentioned amines prepared by adding acrylonitrile to a higher aliphatic alcohol and reducing the addition product, such as octylaminopropyl ether, 2-ethylhexylaminopropyl ether, laurylaminopropyl ether, myristylaminopropyl ether, stearylaminopropyl ether, oleylaminopropyl ether and behenylaminopropyl ether, and amines prepared by adding ethylene oxide or propylene oxide to a higher aliphatic alcohol or alkyl phenol, then adding acrylonitrile to the terminal hydroxyl group and reducing the addition product. The reason for limiting n to a number not exceeding 20 is that if n is larger than 20, the compatibility with the asphalt is lost. As specific examples of the compounds represented by the formula (III), there can be mentioned amines prepared by adding a compound selected from ethylene oxide, propylene oxide, epichlorohydrin, acrylonitrile and acrylic acid esters to a higher aliphatic diamine, for example, derivatives prepared from higher aliphatic propylene diamines, such as N-octyl-N'-hydroxyethyl propylene diamine, N-lauryl-N'-hydroxyethyl propylene diamine, N-palmityl-N'-hydroxyethyl propylene diamine, N-stearyl-N'-hydroxyethyl propylene diamine, N-oleyl-N'-hydroxyethyl propylene diamine, N-behenyl-N'-hydroxyethyl propylene diamine, N-beef-tallow-N'-hydroxyethyl propylene diamine, N-octyl-N'-1-hydroxy-2-methyl-ethyl propylene diamine, N-lauryl-N'-1-hydroxy-2-methyl-ethyl propylene diamine, N-myristyl-N'-1-hydroxy-2-methyl-ethyl propylene diamine, N-palmityl-N'-1-hydroxy-2-methyl-ethyl propylene diamine, N-stearyl-N'-1-hydroxy-2-methyl-ethyl propylene diamine, N-oleyl-N'-1-hydroxy-2-methyl-ethyl propyl propylene diamine, N-behenyl-N'-1-hydroxy-2-methyl-ethyl propylene diamine, N-beef-tallow-N'-1-hydroxy-2-methyl-ethyl propylene diamine, N-octyl-N'-cyanoethyl propylene diamine, N-lauryl-N'-cyanoethyl propylene diamine, N-myristyl-N'-cyanoethyl propylene diamine, N-palmityl-N'-cyanoethyl propylene diamine, N-stearyl-N'-cyanoethyl propylene diamine, N-oleyl-N'-cyanoethyl propylene diamine, N-behenyl-N'-cyanoethyl propylene diamine, N-beef-tallow-N'-cyanoethyl propylene diamine, N-octyl-N'-methylcarboxyethyl propylene diamine, N-lauryl-N'-methylcarboxyethyl propylene diamine, N-myristyl-N'-methylcarboxyethyl propylene diamine, N-stearyl-N'-methylcarboxyethyl propylene diamine, N-oleyl-N'-methylcarboxyethyl propylene diamine, N-behenyl-N'-methylcarboxyethyl propylene diamine and N-beef-tallow-N'-methylcarboxyethyl propylene diamine, and corresponding derivatives prepared from higher aliphatic ethylene diamines. Since these amines have a good compatibility with asphalts, when they react with compounds having two epoxy groups to form linear polymers, these polymers do not separate from asphalts and homogeneous asphalt-epoxy resin compositions can be obtained.

Resins having two epoxy groups are preferably employed as the epoxy resin in the present invention. For example, there are preferably employed a diglycidyl ether of bisphenol A, a diglycidyl ether of polypropylene glycol, a diglycidyl ether of polyethylene glycol, a diglycidyl ester of phthalic acid, and a diglycidyl ether of a bisphenol A-alkylene oxide adduct.

When a compound having three or more epoxy groups is used and mixed with a heated asphalt, a crosslinked polymer is formed and the composition loses its operational adaptability at once.

Any of the commercially available road-paving asphalts can be used in the present invention but the heating temperature is limited. This limitation is concerned with one of the important features of the present invention, namely, the feature that when the composition of the present invention is used for the paving operation, the road can be opened to traffic immediately after the paving operation. From the viewpoints of cooling and operational adaptability of an asphalt mixture, the time allowed for transportation of the asphalt mixture from the manufacturing plant to the paving position is about 1 hour. It is required that during this period, the epoxy resin should react with the amine and polymerization should be advanced so that when the composition is applied to the road bed and the temperature is lowered to ambient temperature, the road can immediately be opened to traffic. For attaining this feature, in the present invention, the asphalt should be heated to from about 40° to about 250° C.

The grading (particle size) of the aggregate of the asphalt mixture including the composition of the present invention as the binder may be the grading of a customarily used aggregate, but the use of an aggregate having an open grading (large particle size distribution) is preferred. The reason is as follows:

The temperature of an asphalt mixture is considerably reduced while it is being paved and roll-pressed, and the compactness attained by the roll-pressing is therefore often insufficient. This tendency becomes conspicuous as modification of the asphalt progresses. If an aggregate having an open grading, providing large voids in the asphalt mixture, is used, this insufficient compactness can be remarkably moderated.

The present invention will now be further described by reference to the following Examples.

EXAMPLE 1

An amine compound having two active hydrogen atoms capable of reacting with epoxy groups was mixed with an equivalent amount of a diglycidyl ether of bisphenol A at a temperature sufficient to keep the mixture liquid, for example, at about 60° C. Then, 40 parts of the resulting liquid mixture was mixed with 60 parts by weight of an asphalt having a penetration of 80 to 100, which was heated at 150° C. The mixture was cast in a layer of a thickness of 1 to 2 mm on a parting agent-coated stainless steel plate placed on a thermoplate maintained at 150° C., allowed to stand for 1 hour to effect natural cooling and aged at 60° C. for 3 days. The viscosity of the sample cast on the stainless steel plate and the tensile strength, elongation, compatibility with asphalt, softening point and Fraass breaking point of the resulting film were measured. The results shown in Table 1 were obtained.

Table 1

| Curing Agent[1] | Tensile Strength (Kg/cm$^2$) | Elongation (%) | Compatibility[2] with Asphalt | Viscosity[3] (Saybolt Furol viscometer | Softening Point (°C.) | Fraass Breaking Point (°C.) |
| --- | --- | --- | --- | --- | --- | --- |
| Product 1 of Present Invention | 3 | — | Δ | | | |
| Product 2 of Present Invention | 72 | 56 | | | | |
| Product 3 of | | | | | | |

Table 1-continued

| Curing Agent[1] | Tensile Strength (Kg/cm$^2$) | Elongation (%) | Compatibility[2] with Asphalt | Viscosity[3] (Saybolt Furol viscometer) | Softening Point (°C.) | Fraass Breaking Point (°C.) |
| --- | --- | --- | --- | --- | --- | --- |
| Present Invention Product 4 of | 60 | 167 | | | | |
| Present Invention Product 5 of | 68 | 240 | | | | |
| Present Invention Product 6 of | 70 | 312 | | | | |
| Present Invention Product 7 of | 58 | 274 | | 273 | 125 | −40 |
| Present Invention Product 8 of | 73 | 320 | | | | |
| Present Invention Product 9 of | 60 | 300 | | | | |
| Present Invention Product 10 of | 70 | 310 | | | | |
| Present Invention Product 11 of | 60 | 260 | | | | |
| Present Invention Product 12 of | 50 | 210 | | | | |
| Present Invention Product 13 of | 51 | 200 | | | | |
| Present Invention Product 14 of | 48 | 180 | | | | |
| Present Invention Product 15 of | 45 | 190 | | | | |
| Present Invention | 65 | 200 | | | | |
| Comparative Product 1 | 0.5 | 1 | X | | | |
| Comparative Product 2 | — | — | X | no flow | | |
| Asphalt | — | — | — | 36 | 41 | −14 |

Note
1)Curing Agent:
Product 1 of Present Invention: octyl amine
Product 2 of Present Invention: lauryl amine
Product 3 of Present Invention: myristyl amine
Product 4 of Present Invention: palmityl amine
Product 5 of Present Invention: stearyl amine
Product 6 of Present Invention: oleyl amine
Product 7 of Present Invention: behenyl amine
Product 8 of Present Invention: beef tallow amine
Product 9 of Present Invention: stearylaminopropyl ether
Product 10 of Present Invention: stearyl-polyoxypropylene-aminopropyl ether (P=5)
Product 11 of Present Invention: N-oleyl-N'-1-hydroxy-2-methyl-ethyl propylene diamine
Product 12 of Present Invention: N-oleyl-N'-hydroxyethyl propylene diamine
Product 13 of Present Invention: N-oleyl-N'-cyanoethyl propylene diamine
Product 14 of Present Invention: N-oleyl-N'-methyl-carboxyethyl propylene diamine
Product 15 of Present Invention: nonylphenol-polyoxypropylene-aminopropyl ether (P=1)
Comparative Product 1: butyl amine
Comparative Product 2: oleyl propylene diamine
2) Compatibility with Asphalt:
 ◯ : film was completely homogeneous
 Δ : slight convexities and concavities were observed on some parts of the film
 X : convexities and concavities were observed throughout the film and thickness differs between convex and concave portions
3)Viscosity:
The sample was heated at 150° C. for 1 hour and the viscosity was measured at 180° C. by using a Saybolt Furol viscometer.

EXAMPLE 2

Marshall and ravelling tests were carried out to examine whether or not an asphalt mixture including the asphalt-epoxy resin composition of the present invention as the binder would have an operational adaptability after standing at 150° C. for 1 hour, regardless of whether or not the resulting pavement would have a strength sufficient so as not to undergo rutting, waving or other unwanted flow and whether or not the resulting pavement would have a sufficient resistance to breaking or scattering by a tire chain or the like.

First, 93.5 parts by weight of an aggregate having a large particle size distribution indicated below and a maximum particle size of 13 mm was heated at 170° C. and 3.9 parts by weight of a straight asphalt having a penetration of 80 to 100, which was heated at 150° C., was incorporated in and mixed with the heated aggregate. Then, 2.6 parts by weight of a liquid mixture formed by mixing 41 parts by weight of oleyl amine with 59 parts by weight of a diglycidyl ether of bisphenol A was added to the above mixture and the resulting mixture was sufficiently agitated. The mixture was pressed and solidified, and then subjected to the tests. The results shown in Table 2 were obtained.

The grading of the aggregate was as follows:

| Sieve Mesh (mm) | Weight of Particles That Passed Through |
| --- | --- |
| 13 | 100 |
| 5 | 55 |
| 2.5 | 38 |
| 0.6 | 33 |
| 0.3 | 30 |
| 0.15 | 18 |
| 0.074 | 12 |

Table 2

| Binder | Amount (%) of Binder | Time (hour) for Standing at 150° C. | Number of Days for Aging at 60° C. pressed and Solidified Sample | Density | Marshall Test Void Ratio (%) | Marshall Test Stability (Kg) | Flow value (1/100 cm) | Ravelling Test wear, cm² |
|---|---|---|---|---|---|---|---|---|
| Product of Present Invention | 6.5 | 0 | 4 | 2.35 | 5.7 | 4550 | 19 | — |
|  |  | 1 | 0 | 2.33 | 6.6 | 500 | 20 | — |
|  |  | 1 | 3 | 2.35 | 5.7 | 4260 | 15 | 0.20 |
| Straight Asphalt | 6.5 | — | 1 | 2.36 | 5.3 | 600 | 33 | 0.90 |

From the results shown in Table 2, it will readily be understood that in the case of an asphalt mixture including the product of the present invention as the binder, even if the road is opened to traffic just after it has been pressed and solidified, since the mixture has a stability similar to that of a straight asphalt, scattering of the pavement is not caused. Regardless of whether the mixture is pressed and solidified just after preparation or after standing at 150° C. for 1 hour, no difference is observed with respect to the density, void ratio and stability. Accordingly, an asphalt mixture including the product of the present invention as the binder creates no problem in connection with the operational adaptability or compactness of the pavement. Further, at the ravelling test wherein an automobile having chain-attached tires is driven on a pavement maintained at −10° C. and the wear of the pavement is measured to evaluate the resistance to scattering at low temperatures, the wear observed in the case of a pavement formed by using the product of the present invention is 1/5 of the wear observed in case of an asphalt pavement.

An asphalt epoxy resin composition obtained by a process according to this invention is used either without aggregate or with aggregate.

In the case the epoxide equivalent of diglycidyl-ether of bisphenol A is 190 and the total amine value of oleylamine is 210, a weight ratio of diglycidyl-ether of bisphenol A to oleylamine to be used is 190:134, which is equal to 59%:41%. Then a composition comprising an epoxy compound and an amine at such a ratio is added to a heated asphalt to give an asphalt epoxy resin composition. The former composition is, in general, used in an amount of from 2 to 90 percent by weight based on the weight of the composition, however depending on an amount of transportation on the road-paving asphalt. If an amount of the composition is less than 2 percent, damage due to rutting of on the road cannot be prevented, as shown in the immersion wheel tracking test described in Table 3.

Table 3

| Amount of epoxy resin % | 0 | 2 | 10 | 20 | 30 | 40 |
|---|---|---|---|---|---|---|
| Deformation percentage (mm/min) | 26.8×10⁻² | 20.3×10⁻² | 2.9×10⁻² | 1.9×10⁻² | 1.2×10⁻² | 1.3×10⁻² |

When an asphalt epoxy resin composition in accordance with this invention is used with aggregate, it serves as a binder. The amount of epoxy resin is, in general, from 2 to 90 percent, preferably from 20 to 40 percent, by weight on the basis of the total weight of the binder. The amount of the binder is from 4.5 to 9.5 percent on the basis of the weight of aggregate.

Examples of such cases will be illustrated in Table 4.

Table 4

| The kinds of mixture | Surface thickness (cm) | Maximum size of aggregate (mm) | Total percent passing (%) Sieve size (mm) | | | | | | | | The amounts of Binder (%) |
|---|---|---|---|---|---|---|---|---|---|---|---|
| | | | 20 | 13 | 5 | 2.5 | 0.6 | 0.3 | 0.15 | 0.074 | |
| Dense graded asphalt epoxy resin concrete | 4–5 | 13 | 100 | 95–100 | 55–75 | 35–50 | 18–29 | 10–21 | 6–16 | 4–8 | 5–7 |
| Dense and gap-graded asphalt epoxy resin concrete | 3–5 | 13 | 100 | 95–100 | 35–55 | 30–45 | 20–40 | 15–30 | 5–15 | 2–10 | 4.5–6.5 |
| Carpet-coat | 1.5–2.5 | 5 | — | 100 | 90–100 | 50–80 | — | 15–35 | — | 3–12 | 6–9.5 |
| Gap-graded carpet-coat | 1.5–2.0 | 5 | — | 100 | 90–100 | 30–45 | 10–22 | 5–18 | — | 4–12 | 5–6.5 |

In accordance with this invention involving no aggregate, the number of moles of an amine component used is substantially equal to the number of moles of an epoxy component. The epoxy compound and amine compound are analyzed in terms of epoxide equivalent and total amine value, respectively. For example, an amine having two active hydrogen atoms has epoxide equivalent as calculated from the following equation.

$$\frac{56,100}{\text{TOTAL AMINE VALUE}} \times \frac{1}{2}$$

The embodiments of the invention in which an exclusive property or privilege is claimed are defined as follows:

1. A process for preparing an asphalt-epoxy resin composition which comprises: mixing heated asphalt at a temperature of from about 40° to about 250° C., with a mixture of (A) diepoxy compound and (B) an amine having only two amino hydrogen atoms in the molecule and having either an aliphatic hydrocarbon group having 8 to 22 carbon atoms or an alkylphenyl group in which the alkyl has 8 to 22 carbon atoms, said diepoxy compound (A) reacting with said amine (B) to form a thermoplastic linear epoxy resin uniformly distributed in said asphalt.

2. A process according to claim 1 wherein said amine is a compound or mixture of compounds having the formula:

R—NH₂   (I)

wherein R is alkyl having 8 to 22 carbon atoms or alkenyl having 8 to 22 carbon atoms.

3. A process according to claim 1 wherein said amine is a compound or mixture of compounds having the formula:

R'—O—A$_n$—(CH₂)₃—NH₂   (II)

wherein R' is alkyl having 8 to 22 carbon atoms or alkenyl having 8 to 22 carbon atoms, or alkylphenyl in which the alkyl has 8 to 22 carbon atoms, A is oxyethylene or oxypropylene, and n is an integer of from 0 to 20.

4. A process according to claim 1 wherein said amine is a compound or mixture of compounds having the formula:

RNH—R₁—NH—B   (III)

wherein R is alkyl having 8 to 22 carbon atoms or alkenyl having 8 to 22 carbon atoms, R₁ is alkylene having 2 to 3 carbon atoms, and B is selected from the group consisting of hydroxyethyl, 1-hydroxy-2-methyl-ethyl, 1-chloro-2-hydroxypropyl, cyanoethyl and propionic acid ester groups.

5. A process according to claim 2, claim 3 or claim 4 wherein said diepoxy compound is selected from the group consisting of diglycidyl ether of bisphenol A, diglycidyl ether of polypropylene glycol, diglycidyl ether of polyethylene glycol, diglycidyl ester of phthalic acid and diglycidyl ether of bisphenol A-alkylene oxide adduct.

6. A process according to claim 1 wherein the number of moles of said amine is substantially equal to the number of moles of said epoxy compound.

7. A composition consisting essentially of (1) from 10 to 98 percent by weight of asphalt and (2) from 2 to 90 percent by weight of linear thermoplastic epoxy resin prepared by admixing in said asphalt, while said asphalt is at a temperature of from about 40° to about 250° C., a mixture of substantially equimolar amounts of (A) diepoxy compound and (B) an amine having only two amino hydrogen atoms in the molecule and having either an aliphatic hydrocarbon group having 8 to 22 carbon atoms or an alkylphenyl group in which the alkyl has 8 to 22 carbon atoms.

8. A composition according to claim 7 in which the amount of said linear thermoplastic epoxy resin is from 20 to 40 percent by weight.

9. A composition according to claim 7 in which said amine is selected from the group consisting of
(1) a compound or mixture of compounds having the formula:

R—NH₂   (I)

wherein R is alkyl having 8 to 22 carbon atoms or alkenyl having 8 to 22 carbon atoms,
(2) a compound or mixture of compounds having the formula:

R'—O—A$_n$—(CH₂)₃—NH₂   (II)

wherein R' is alkyl having 8 to 22 carbon atoms or alkenyl having 8 to 22 carbon atoms, or alkylphenyl in which the alkyl has 8 to 22 carbon atoms, A is oxyethylene or oxypropylene, and n is an integer of from 0 to 20, and
(3) a compound or mixture of compounds having the formula:

RNH—R₁—NH—B   (III)

wherein R is alkyl having 8 to 22 carbon atoms or alkenyl having 8 to 22 carbon atoms, R₁ is alkylene having 2 to 3 carbon atoms, and B is selected from the group consisting of hydroxyethyl, 1-hydroxy-2-methylethyl, 1-chloro-2-hydroxypropyl, cyanoethyl and propionic acid ester groups.

10. A composition as claimed in claim 9 in which said diepoxy compound is selected from the group consisting of diglycidyl ether of bisphenol A, diglycidyl ether of polypropylene glycol, diglycidyl ether of polyethylene glycol, diglycidyl ester of phthalic acid and diglycidyl ether of bisphenol A-alkylene oxide adduct.

11. A paving composition consisting essentially of paving aggregate and from 4.5 to 9.5 percent by weight of binder, based on the weight of said aggregate, said binder consisting essentially of (1) from 10 to 98 percent by weight of asphalt and (2) from 2 to 90 percent by weight of linear thermoplastic epoxy resin prepared by admixing in said asphalt, while said asphalt is at a temperature of from about 40° to about 250° C., a mixture of substantially equimolar amounts of (A) diepoxy compound and (B) an amine having only two amino hydrogen atoms in the molecule and having either an aliphatic hydrocarbon group having 8 to 22 carbon atoms or an alkylphenyl group in which the alkyl has 8 to 22 carbon atoms.

12. A composition according to claim 11 in which the amount of said linear thermoplastic epoxy resin is from 20 to 40 percent by weight.

13. A composition according to claim 11 in which said amine is selected from the group consisting of
(1) a compound or mixture of compounds having the formula:

R—NH₂   (I)

wherein R is alkyl having 8 to 22 carbon atoms or alkenyl having 8 to 22 carbon atoms,
(2) a compound or mixture of compounds having the formula:

R'—O—A$_n$—(CH₂)₃—NH₂   (II)

wherein R' is alkyl having 8 to 22 carbon atoms or alkenyl having 8 to 22 carbon atoms, or alkylphenyl in which the alkyl has 8 to 22 carbon atoms, A is oxyethylene or oxypropylene, and n is an integer of from 0 to 20, and
(3) a compound or mixture of compounds having the formula:

RNH—R₁—NH—B   (III)

wherein R is alkyl having 8 to 22 carbon atoms or alkenyl having 8 to 22 carbon atoms, R₁ is alkylene having 2 to 3 carbon atoms, and B is selected from the group consisting of hydroxyethyl, 1-hydroxy- 2-methylethyl, 1-chloro-2-hydroxypropyl, cyanoethyl and propionic acid ester groups.

14. A composition as claimed in claim 13 in which said diepoxy compound is selected from the group consisting of diglycidyl ether of bisphenol A, diglycidyl ether of polypropylene glycol, diglycidyl ether of polyethylene glycol, diglycidyl ester of phthalic acid and diglycidyl ether of bisphenol A-alkylene oxide adduct.

* * * * *